(12) United States Patent
Shim

(10) Patent No.: US 6,327,007 B1
(45) Date of Patent: Dec. 4, 2001

(54) LIQUID CRYSTAL DISPLAY ACTIVE MATRIX WITH MULTIPLE REPAIR LINES HAVING RECTANGULAR CLOSED LOOPS

(75) Inventor: Chang Bo Shim, Kumi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/434,119

(22) Filed: Nov. 5, 1999

(30) Foreign Application Priority Data

Nov. 7, 1998 (KR) .................................................. 98-47625

(51) Int. Cl.[7] .................................................. G02F 1/1333
(52) U.S. Cl. .............................................. 349/54; 349/192
(58) Field of Search ........................... 349/54, 192, 55, 349/148, 40, 93; 345/93

(56) References Cited

U.S. PATENT DOCUMENTS

| | | | |
|---|---|---|---|
| 5,303,074 | * | 4/1994 | Salisbury ................................ 359/59 |
| 5,608,245 | * | 3/1997 | Martin ................................... 257/291 |
| 5,729,309 | * | 3/1998 | Na et al. ................................. 349/54 |
| 5,859,679 | * | 1/1999 | Song ...................................... 349/54 |
| 6,014,191 | * | 1/2000 | Kim et al. ............................... 349/54 |

* cited by examiner

*Primary Examiner*—Toan Ton
*Assistant Examiner*—Andrew Schechter
(74) *Attorney, Agent, or Firm*—Long Aldridge & Norman, LLP

(57) ABSTRACT

A liquid crystal display array panel includes a substrate, a plurality of gate lines on the substrate, a plurality of data lines on the substrate, an active display region having a plurality of pixels defined by the plurality of gate lines and data lines, and at least two repair lines partially positioned on the active display region and separated from each other. The repair lines crossing some of the plurality of gate lines and all the data lines.

5 Claims, 5 Drawing Sheets

LIQUID CRYSTAL DISPLAY ACTIVE MATRIX WITH MULTIPLE REPAIR LINES HAVING RECTANGULAR CLOSED LOOPS

This application claims the benefit of Korean Patent Application No. 1998-47625, filed on Nov. 7, 1998, which is hereby incorporated by reference for all purposes as if fully set forth herein.

BACKGROUND OF THE INVENTION

1. Field of the Invention

The present invention relates to a liquid crystal display (LCD) device, and more particularly, to an array panel of the LCD device with a repair structure.

2. Description of the Related Art

In general, a liquid crystal display (LCD) device displays an image using a plurality of pixels. The LCD device having a thin film transistor (TFT) as a switching element is typically called a thin film transistor liquid crystal display (TFT-LCD) device.

The TFT as the switching element has a gate electrode, a source electrode and a drain electrode. The gate and source electrodes of the TFT are connected to gate and data lines, respectively. Through the gate line, a pulse voltage is applied to operate the gate electrode, and through the data line, a signal voltage is transmitted to operate the source electrode.

The LCD device has a plurality of pixels, each of which is operated by a corresponding switching element that is driven by the gate and data lines.

The plurality of pixels and the TFTs are formed in a microstructure, and it is very important to form the gate and data lines and other components of the TFTs uniformly. In a display device, therefore, even a small particle may cause a point defect such as a pixel defect and a line defect such as an open gate and/or data lines.

Such defects have become serious problems with the increase in the display area of the image device. To solve the problems, a redundant design or repair structure has been introduced. The redundant design or repair structure is more needed for repairing a line defect than a point defect, since a point defect can be repaired without severely damaging the product. However, even one line defect may deteriorate the value of the product. Thus, a redundant design for the line defect has been developed.

FIG. 1 shows a conventional repair structure for a line defect of a TFT-LCD device. An active display region 17 with a plurality of pixels is located on a substrate of a liquid crystal display (LCD) device. A plurality of gate lines 11 are arranged in a transverse direction and a plurality of data lines 13 are arranged in a longitudinal direction. A repair line 15 is located outside the active display region 17 in order to repair an open data line. When one of the data lines 13 is opened, the repair line 15 is connected to the open line at two cross points SP1 and SP2. Then, the data signal flows toward a source electrode along a path in the repair line 15.

FIG. 2 shows a modified conventional repair structure of FIG. 1, and FIG. 3 shows another conventional repair structure. In FIGS. 2 and 3, the same method as in FIG. 1 is used to repair the line defect.

However, the conventional repair structures have the following disadvantages. Since the repair line 15 is formed outside the active display region 17 in FIGS. 1, 2 and 3, the length of the path of the repair line 15 along which the gate or data signals must flow is long. Thus, a resistance of the repair line 15 increases causing signal loss and signal delay. In addition, crosstalk at the affected area of the LCD device resulting from a parasitic capacitance generated at a crossing portion of the repair line and the gate or data line is large.

SUMMARY OF THE INVENTION

Accordingly, the present invention is directed to a liquid crystal display array panel having a repair structure that substantially obviates one or more of the problems due to limitations and disadvantages of the related art.

An object of the present invention is to provide a repair structure having a reduced or minimum length of the path in repairing opened gate or data lines.

Additional features and advantages of the invention will be set forth in the description with follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display array panel includes a substrate; a plurality of gate lines on the substrate; a plurality of data lines on the substrate extending transverse to the plurality of gate lines; an active display region having a plurality of pixels defined by the plurality of gate lines and data lines; at least two repair lines partially positioned on the active display region and separated from each other; and wherein the repair lines cross some of the plurality of gate lines and all the data lines.

The repair lines are in the form of a rectangular closed loop, each having first and second transverse lines spaced from each other, and first and second longitudinal lines for connecting the first and second transverse lines. The rectangular closed loop repair lines are spaced from and parallel to each other. At least one of the transverse lines of the repair line is positioned under one of the plurality of gate lines with a first insulating layer therebetween. The transverse line under the gate line has a protrusion in a first region under the data line other than a second region where the gate line covers. Further, a liquid crystal display array panel includes a connection bar extending over corresponding longitudinal lines of the adjacent repair lines while a second insulating layer lies between the connection bar and the repair lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
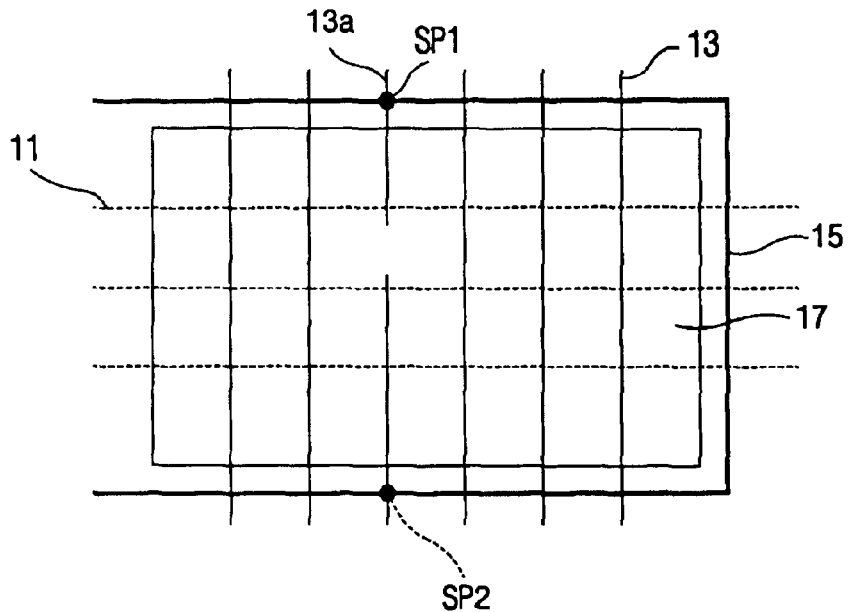
FIG. 1 is a plan view illustrating a repair structure for an LCD device according to the prior art.
Figure 2:
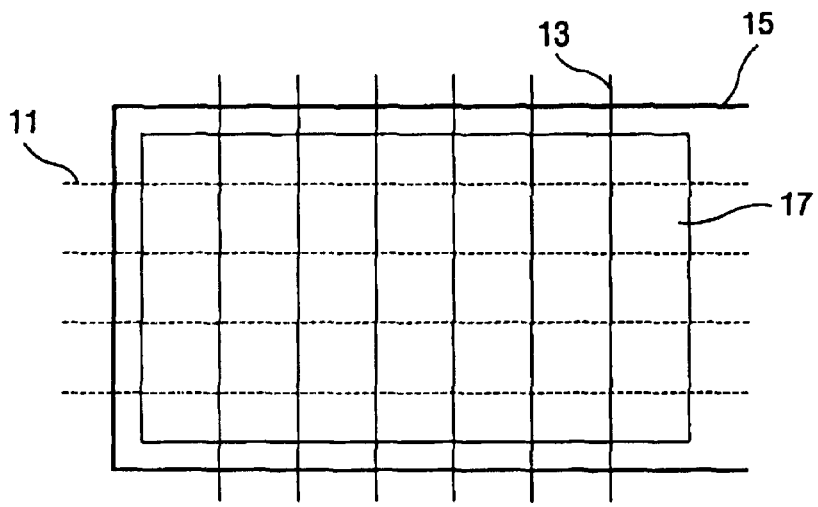
FIG. 2 shows a modified repair structure of FIG. 1.
Figure 3:
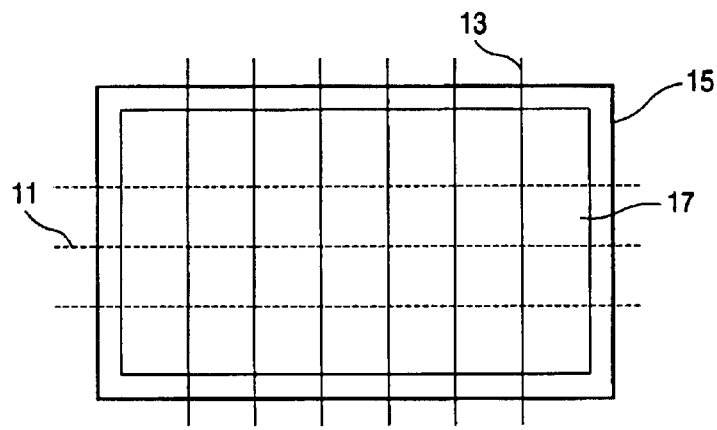
FIG. 3 is a plan view illustrating another repair structure according to the prior art.
Figure 4:
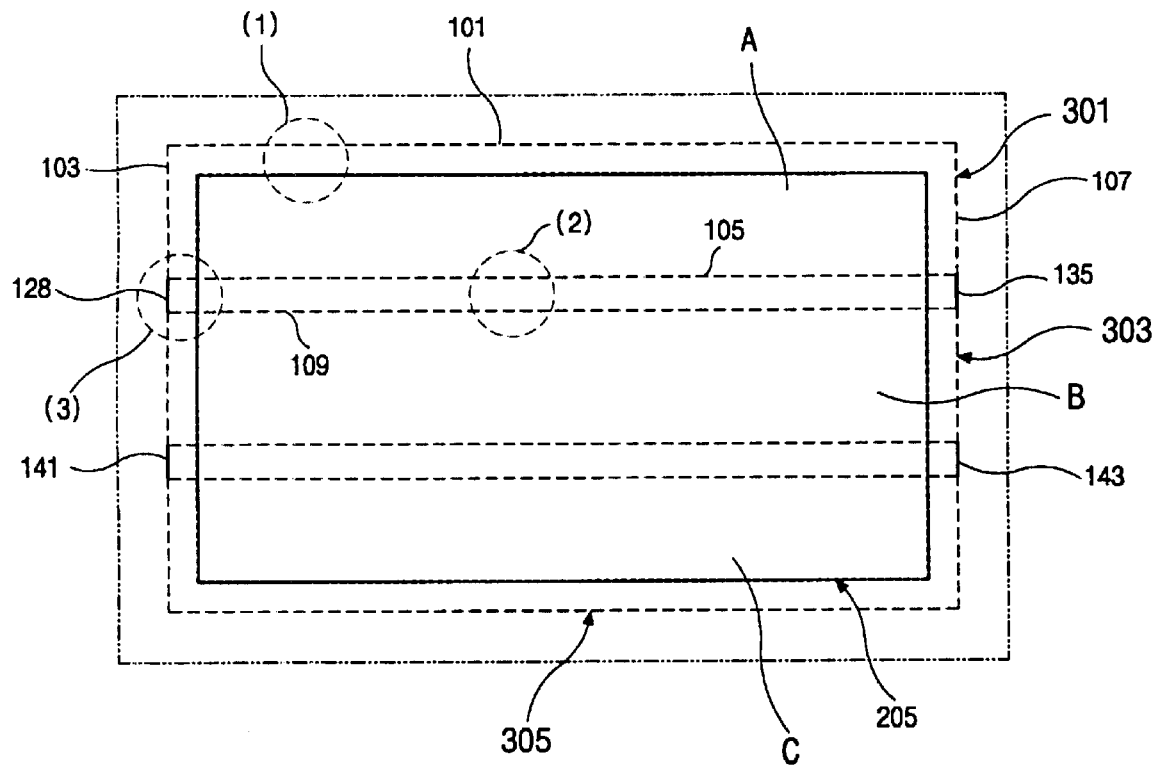
FIG. 4 is a plan view illustrating a repair structure according to an embodiment of the present invention.

As shown in FIG. 4, an active display region 205 with a plurality of pixels is divided into three sections "A", "B" and "C". Three repair lines 301, 303 and 305 are located in sections "A", "B" and "C" in the form of a rectangular closed loop, respectively. They are also electrically disconnected from each other.

The rectangular closed loop repair line 301 in section "A" has a first transverse repair line 101, a second transverse repair line 105 spaced from and parallel to the first transverse repair line 101, and first and second longitudinal repair lines 103 and 107 connecting the first and second transverse repair lines 101 and 105. The first and second longitudinal repair lines 103 and 107 are located in the non-display region or outside the active display region 205 without overlapping the data lines (not shown).

The rectangular closed loop repair lines 303 and 305 of sections "B" and "C" are substantially the same as that of section "A".

First and second connection bars 128 and 135 are preferably arranged to couple the rectangular closed loop repair lines 301 and 303. The third and fourth connection bars 141 and 143 are also arranged to connect the rectangular closed loop repair lines 303 and 305. The connection bars 128, 135, 141 and 143 are arranged on an insulating layer on the rectangular closed loop repair lines 301, 303 and 305.

Figure 5:
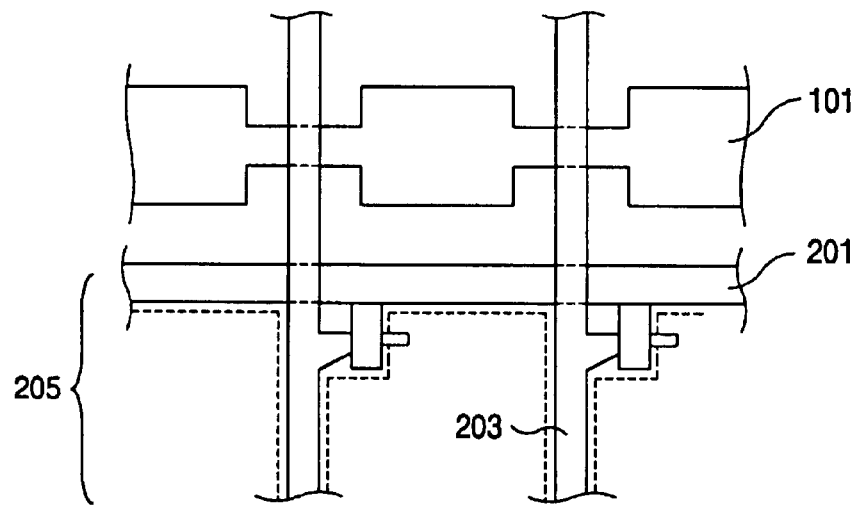
FIG. 5 is an enlarged view of portion "(1)" of FIG. 4.

As shown in FIG. 5, which is an enlarged view of portion (1) in FIG. 4, the first transverse repair line 101 is located at a portion outside the active display region 205 and crosses over the data line 203 with an insulating layer (not shown) between them.

Figure 6:
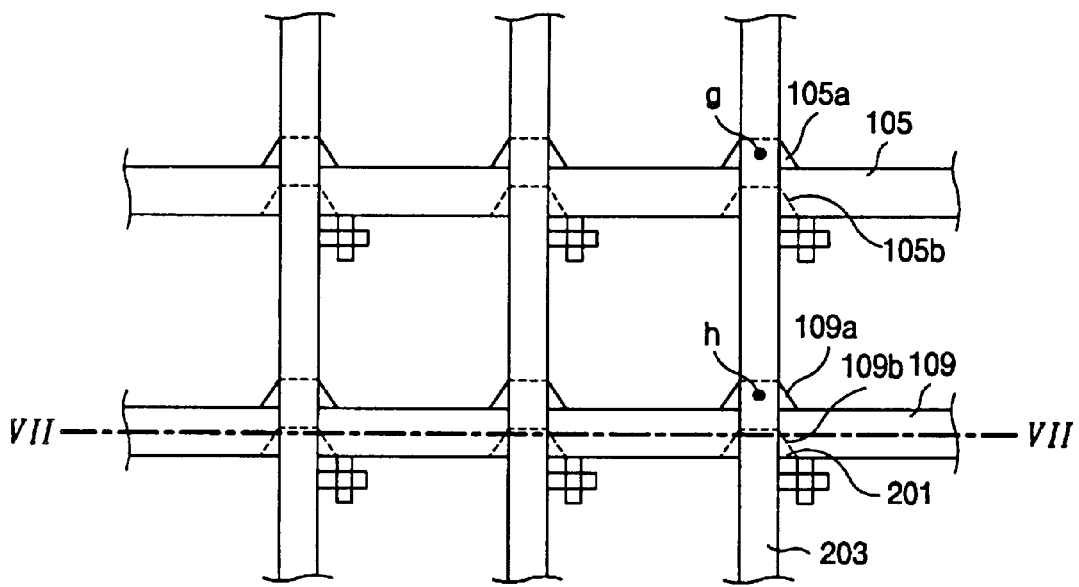
FIG. 6 is an enlarged view of portion "(2)" of FIG. 4.

FIG. 6 is an enlarged view of portion (2) in FIGS. 4. As shown in FIG. 6, the transverse repair lines 105 and 109 have protrusion portions 105*a* and 109*a* and recess portions 105*b* and 109*b*, respectively, at all cross points with the data lines 203 such as the cross points "g" and "h". The gate line is linearly shaped without any protrusions. Thus, there is no gate line over the protrusion portions 105*a* and 109*a* of the repair lines 105 and 109.

Figure 7:
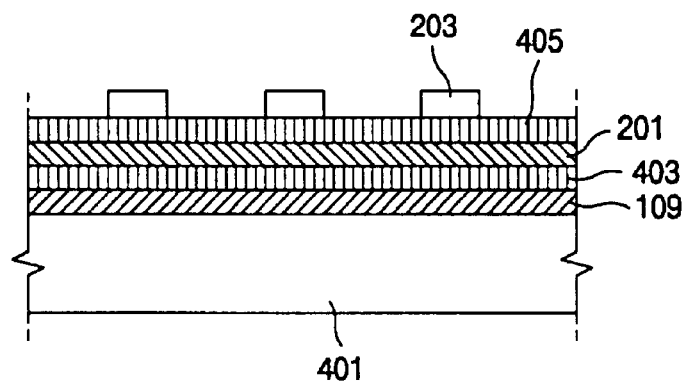
FIG. 7 is a sectional view taken along line VII—VII of FIG. 6.

FIG. 7 shows a sectional view taken along line VII—VII of FIG. 6. On a glass substrate 401 is deposited and patterned a suitable conductive metal preferably selected from the group consisting of Mo, Al, W and W-Ta or the like in order to form the repair line 109. Then, a first insulating layer 403 is formed on the repair line 109. On the first insulating layer 403 is formed the gate line 201. On the gate line 201, a second insulating layer 405 is formed. On the second insulating layer 405, the data lines 203 are formed which cross over the gate line 201. The repair line 109, the gate line 201 and the data line 203 are electrically disconnected or insulated from each other by the first and second insulating layers 403 and 405.

When the gate line 201 become open, it is electrically connected to the repair line 109 through the first insulating layer 403 at a point where the repair line 109 is positioned below the opened gate line 201. When the data line 203 is opened, it is shorted with the repair line 109 at the protrusion portion 109*a* through the second insulating layer 405.

Figure 8:
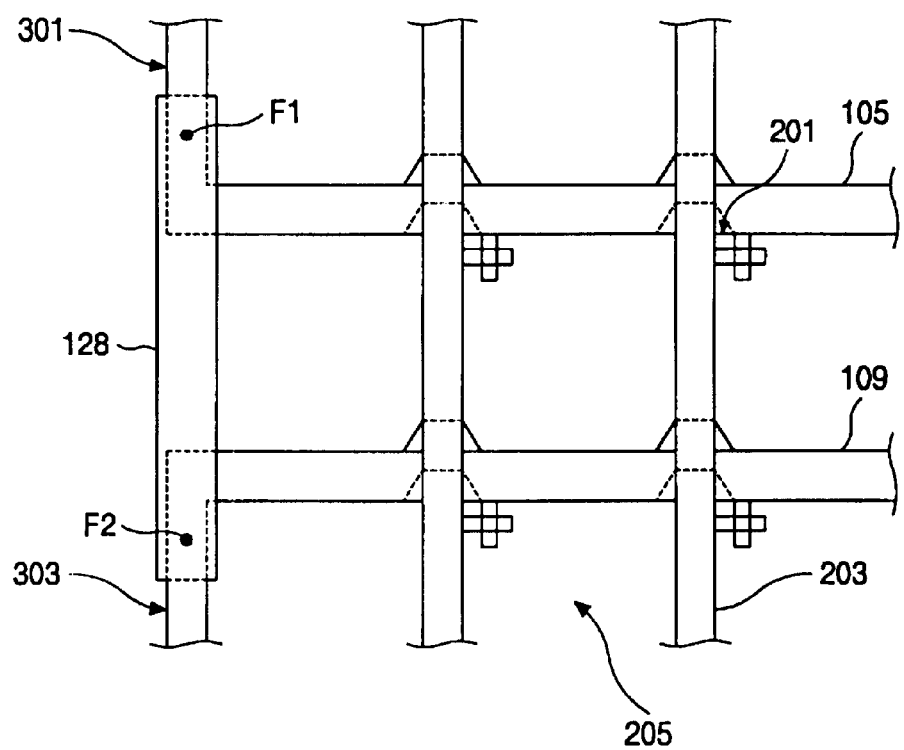
FIG. 8 is an enlarged view of portion "(3)" of FIG. 4.

FIG. 8 shows one of the connection bars for coupling the adjacent rectangular closed loop repair lines 301, 303 and 305. The connection bar 128 couples the adjacent repair lines 301 and 303 mainly when one of the repair lines 301 and 303 is opened. The connection bar 128 is arranged on an insulating layer (not shown) over each end portion of the first longitudinal repair lines of the rectangular closed loop repair lines 301 and 303. The rectangular closed loop repair lines 301 and 303 are connected to each other at the overlapping portions "F1" and "F2" by the connection bar 128.

Figure 9:
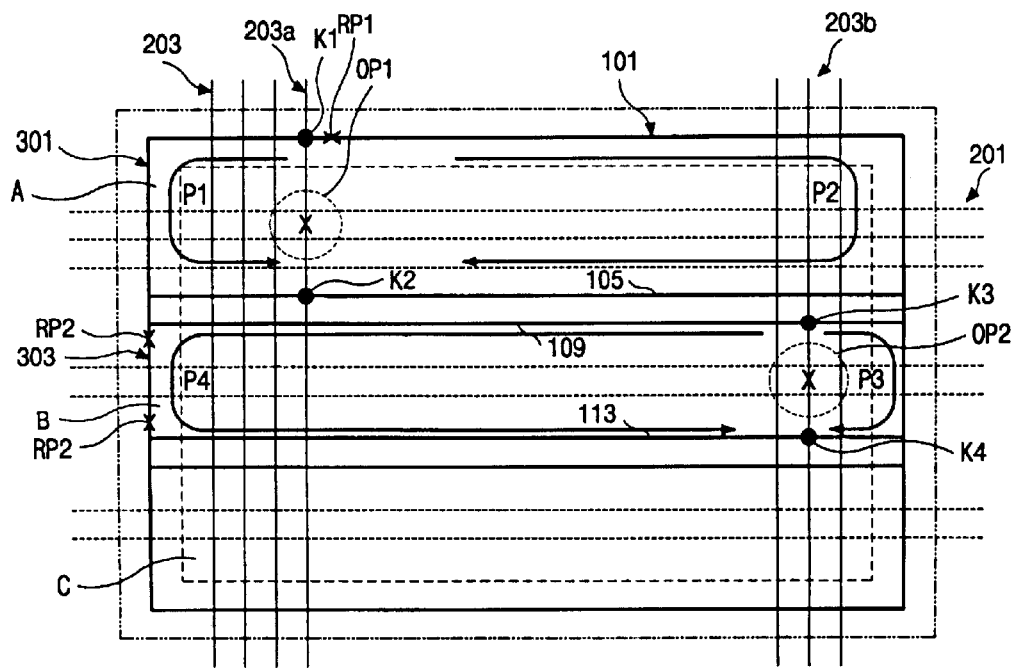
FIG. 9 is a plan view illustrating a line defect of a data line according to the embodiment of the present invention.

FIG. 9 shows a method for repairing a data line with a line defect.

Let us assume that certain data lines 203*a* and 203*b* are opened at portions OP1 and OP2 in sections "A" and "B", respectively. In order to repair the open portion OP1 in section "A", the data line 203*a* is connected to the first transverse repair line 101 of the closed loop repair line 301 at a cross point "K1" and to the second transverse repair line 105 of the repair line 301 at a cross point "K2". Then the data signal can transmit through two paths P1 and P2. Then, a portion RP1 in the longer path P2 is preferably cut.

In order to repair the open portion OP2, the data line 203*b* is connected to the first transverse repair line 109 of the closed loop repair line 303 at a cross point "K3" and to the second transverse repair line 113 of the repair line 303 at a cross point "K4". The data signal can transmit through two paths P3 and P4. Then, a small portion in the longer path P4 is preferably cut.

Figure 10:
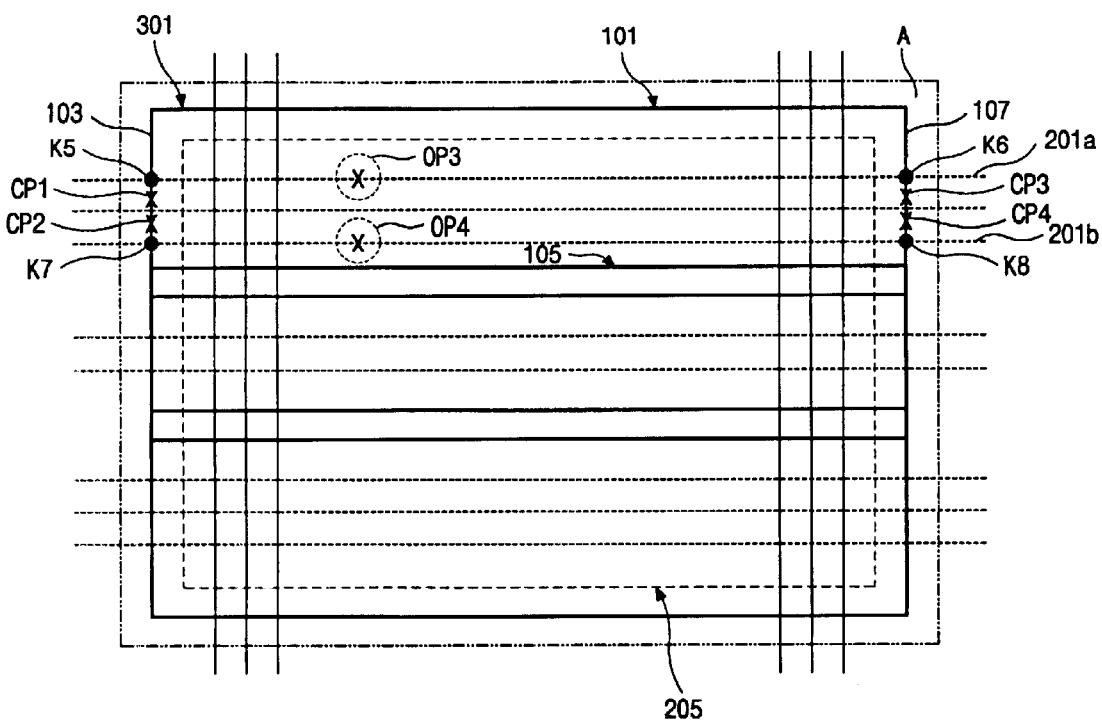
FIG. 10 is a plan view illustrating a line defect of a gate line according to the embodiment of the present invention.

FIG. 10 shows a method for repairing a line defect in a gate line.

Let us assume that certain gate lines 201*a* and 201*b* become open at portions OP3 and OP4 in section "A", respectively. In order to repair the open portion OP3 in the section "A", the gate line 201*a* is connected to the first longitudinal repair line 103 of the closed loop repair line 301 at a cross point "K5" and to the second longitudinal repair line 107 of the repair line 301 at a cross point "K6". In order to repair the open portion OP4, the gate line 201*b* is connected to the first longitudinal repair line 103 of the closed loop repair line 301 at a cross point "K7" and to the second longitudinal repair line 107 of the repair line 301 at a cross point "K8".

However, paths that will interfere with the repair line should be removed. For example, one path in the rectangular closed loop repair line 301 which is connected to a good gate line and the other path in the rectangular closed loop repair line 301 which is connected to the good gate line should be electrically disconnected from each other. Thus, portions CP1 and CP2 on the first longitudinal repair line 103 and cutting portions CP3 and CP4 on the second longitudinal repair line 107 are removed or cut to allow each gate signal to flow separately along each corresponding path in the rectangular closed loop repair line 301.

The repair structure according to the present invention has several advantages. For example, since the length of the repair line becomes smaller, the resistance of the repair line decreases. Thus, signal loss and signal delay due to the open in the signal lines such as data lines and gate lines can be reduced.

The rectangular loop repair lines shown and described in the present invention may be a closed loop as described or an open loop such as a "C" shape, for example.

It will be apparent to those skilled in the art that various modifications and variation can be made in the liquid crystal display array panel having a repair structure of the present invention without departing from the spirit or scope of the invention. Thus, it is intended that the present invention cover the modifications and variations of this invention provided they come within the scope of the appended claims and their equivalents.

What is claimed is:

1. A liquid crystal display array panel, comprising:

a substrate;

a plurality of gate lines on said substrate;

a plurality of data lines on said substrate;

an active display region having a plurality of pixels defined by the plurality of gate lines and data lines; and at least two repair lines partially positioned on said active display region and separated from each other;

wherein said two repair lines cross some of said plurality of gate lines and all of the data lines; and wherein each of said repair lines has a rectangular closed loop, each,having first and second transverse lines spaced from each other, and first and second longitudinal lines for connecting the first and second transverse lines.

2. An array panel of claim 1, wherein said repair lines are spaced from and parallel to each other.

3. An array panel of claim 2, further comprising:

a connection bar extending over corresponding longitudinal lines of the adjacent repair lines; and an insulating layer between the connection bar and the repair lines.

4. An array panel of claim 2, wherein at least one of the transverse lines of the repair line is positioned under one of the plurality of gate lines with an insulating layer therebetween.

5. An array panel of claim 4, wherein the at least one of the transverse lines under the gate line has a protrusion in a first region under the data line other than a second region where the gate line covers.

* * * * *